(12) United States Patent
Kiyoki et al.

(10) Patent No.: US 6,334,129 B1
(45) Date of Patent: Dec. 25, 2001

(54) DATA PROCESSING APPARATUS AND METHOD

(75) Inventors: Yasushi Kiyoki, 1148-24, Nagakuni, Tsuchiura-shi, Ibaraki-ken; Takashi Kitagawa, 207-202, Namiki 2-chome, Tsukuba-shi, Ibaraki-ken; Teruyoshi Washizawa, Atsugi, all of (JP)

(73) Assignees: Canon Kabushiki Kaisha, Tokyo; Takashi Kitagawa; Yasushi Kiyoki, both of Ibaraki-ken, all of (JP)

( * ) Notice: Subject to any disclaimer, the term of this patent is extended or adjusted under 35 U.S.C. 154(b) by 0 days.

(21) Appl. No.: 09/236,221

(22) Filed: Jan. 25, 1999

(30) Foreign Application Priority Data

Jan. 30, 1998 (JP) .................................. 10-018934

(51) Int. Cl.$^7$ ................................... G06F 17/30
(52) U.S. Cl. ............................ 707/5; 707/1; 707/2; 707/3
(58) Field of Search ................................... 707/5, 1, 3, 2; 704/7

(56) References Cited

U.S. PATENT DOCUMENTS

| | | | |
|---|---|---|---|
| 5,864,846 | * | 1/1999 | Voorhees et al. ........................ 707/5 |
| 5,920,859 | * | 7/1999 | Li .............................................. 707/5 |
| 5,943,669 | * | 8/1999 | Numata ..................................... 707/5 |
| 6,131,082 | * | 10/2000 | Hargrave, III et al. ................. 704/7 |

OTHER PUBLICATIONS

"A Metadatabase System for Semantic Image Search By a Mathematical Model of Meaning", Yasushi Kiyoki, et al., SIGMOD Record, vol, 23, No. 4, Dec. 1994, pp. 34–40.

"A Fast Semantic Image Search Algorithm by a Mathematical Model of Meaning", T. Miyahara, et al., Research Report of the Information Processing Society of Japan, Database System 113–41, pp. 245–250, Jul. 15, 1997.

* cited by examiner

Primary Examiner—Hosain T. Alam
Assistant Examiner—Cam-Y Truong
(74) Attorney, Agent, or Firm—Fitzpatrick, Cella, Harper & Scinto (57) ABSTRACT

A data processing apparatus for extracting, from a set of data having a vector format stored in a database, a first prescribed number of items of data having a high degree of similarity with a query vector includes a list creation unit and a candidate output unit. The list creation unit creates lists of data in each of which data of the database is sorted in order of decreasing strength of respective one component of a vector. The candidate output unit decides the priority of each list, successively selects, from the lists based upon the list priority and ranking in each list, a second prescribed number of items of data not yet output, and outputs one item of data, from the second prescribed number of items of data selected, based upon degree of similarity between each item of the above-mentioned data and the query data. By virtue of the list creation unit and candidate output unit, the first prescribed number of items of candidate data similar to a query vector are obtained at high speed from the data in the database.

13 Claims, 10 Drawing Sheets

FIG. 2

| 9 | 1 | 3 | 2 | 2 |
|---|---|---|---|---|
| 8 | 5 | 6 | 6 | 3 |
| 1 | 7 | 10 | 9 | 7 |
| 7 | 4 | 4 | 10 | 10 |
| 4 | 10 | 8 | 5 | 9 |
| 2 | 2 | 1 | 3 | 8 |
| 5 | 9 | 7 | 8 | 6 |
| 3 | 6 | 5 | 1 | 4 |
| 6 | 8 | 9 | 4 | 5 |
| 10 | 3 | 2 | 7 | 1 |

| | | | | | NRM |
|---|---|---|---|---|---|
| -1 | -1 | 0.5070 | 0.5376 | -1 | |

| | | | | | INDX |
|---|---|---|---|---|---|
| 1 | 1 | 1 | 1 | 1 | |

| | | | ANS |
|---|---|---|---|
| - | - | - | |

| | | | TNRM |
|---|---|---|---|
| -1 | 0.5376 | 0.5070 | |

| | | | PTR |
|---|---|---|---|
| 0 | 1 | 2 | |

| | | | | | | | | | R |
|---|---|---|---|---|---|---|---|---|---|
| 6 | 3 | 5 | 2 | 4 | 7 | 1 | 8 | 9 | |
| 8 | 6 | 9 | 2 | 10 | 4 | 7 | 5 | 1 | |
| 9 | 5 | 7 | 1 | 8 | 4 | 10 | 6 | 3 | |
| 4 | 1 | 8 | 3 | 5 | 10 | 9 | 6 | 2 | |
| 5 | 4 | 6 | 8 | 9 | 10 | 7 | 3 | 2 | |
| 10 | 3 | 2 | 7 | 1 | | | | | |

| | | | | | PAX |
|---|---|---|---|---|---|
| 4 | 3 | 2 | 1 | 5 | |

FIG. 8

| TNRM |
|---|
| -1 |
| 0.3945 |
| 0.5070 |

| PTR |
|---|
| 1 |
| 2 |
| 3 |

| ANS |
|---|
| 7 |
| - |
| - |

| NRM |
|---|
| -1 |
| -1 |
| 0.5070 |
| 0.3945 |
| -1 |

| INDX |
|---|
| 1 |
| 1 |
| 1 |
| 2 |
| 1 |

R:

| | | | | | | | | | |
|---|---|---|---|---|---|---|---|---|---|
| 9 | 8 | 1 | 7 | 4 | 2 | 5 | 3 | 6 | 10 |
| 1 | 5 | 7 | 4 | 10 | 2 | 9 | 6 | 8 | 3 |
| 3 | 6 | 10 | 4 | 8 | 1 | 7 | 5 | 9 | 2 |
| 2 | 6 | 9 | 10 | 5 | 3 | 8 | 1 | 4 | 7 |
| 2 | 3 | 7 | 10 | 9 | 8 | 6 | 4 | 5 | 1 |

PAX: 4, 3, 2, 1, 5

FIG. 9

| TNRM |
|---|
| 0.3945 |
| 0.4880 |
| 0.3286 |

| ANS |
|---|
| 7 |
| 2 |
| - |

| PTR |
|---|
| 1 |
| 2 |
| 3 |

| NRM |
|---|
| -1 |
| 0.3286 |
| 0.4880 |
| 0.3945 |
| -1 |

| INDX |
|---|
| 1 |
| 1 |
| 2 |
| 2 |
| 1 |

R:

| | | | | | | | | |
|---|---|---|---|---|---|---|---|---|
| 6 | 3 | 5 | 2 | 4 | 7 | 1 | 8 | 9 |
| 8 | 6 | 9 | 2 | 10 | 4 | 7 | 5 | 1 |
| 9 | 5 | 7 | 1 | 8 | 4 | 10 | 6 | 3 |
| 4 | 1 | 8 | 3 | 5 | 10 | 9 | 6 | 2 |
| 5 | 4 | 6 | 8 | 9 | 10 | 7 | 3 | 2 |
| 10 | 3 | 2 | 7 | 1 | | | | |

PAX: 4, 3, 2, 1, 5

DATA PROCESSING APPARATUS AND METHOD

BACKGROUND OF THE INVENTION

This invention relates to a data processing apparatus and method for calculating the degree of similarity between vectors and, more particularly, to a data processing apparatus and method for outputting a prescribed number of items of data based upon degree of similarity with a query vector.

In general, distance is used as a means of calculating the degree of similarity between vectors. When a certain key vector has been given, a problem often dealt with is the extraction of L-number of vectors close to the key vector from a set of predetermined vectors. If a comparison operation with respect to all vectors in the set is performed, the amount of computation is on the order of O(MN), where M represents the number of vector dimensions and N the number of elements in the set of vectors.

Accordingly, several high-speed algorithms for distance computation have been proposed. The strategy common to these high-speed algorithms is to structuralize the data in advance and reduce the complexity of computation when distance is calculated.

For example, a method of creating sorting lists based upon the values of components along the respective axes of vectors involves sorting axes by an appropriate priority when a key vector has been given and specifying where the component values of the key vector are located in the sorting list of the axis situated at the highest ranking position. Then, on the basis of the vector IDs, the distances between the vectors and the key vector are calculated in order starting from a vector that has been stored at a nearby position. In order to obtain accurate results, the distance between all vectors and the key vector must be calculated. However, if the order relating to the component values of the selected axes approximately reflects the actual distances between the vectors, then satisfactory results can be attained with a small amount of calculation.

According to this method, an amount of calculation on the order of $O(Nlog_2N)$ suffices for preprocessing (structuralization of the data) and on the order of $O(Llog_2N)$ for the comparison with L-number of vectors. Though there are a K-d tree and its derivative versions in addition to this method, which is referred to as a projection method, the orders of the amounts of calculation for the preprocessing and the comparison operation are the same.

The prior art described above concerns the calculation of distances between vectors. However, there are cases where a norm is effective as a gauge for expressing the degree of similarity between vectors. For example, in "A Metadatabase System for Semantic Image Search by a Mathematical Model of Meaning", by Y. Kiyoki, T. Kitagawa and T. Hayama, SIGMOD RECORD, Vol. 23, No. 4 (December 1994) (referred to as "Reference 1" below), the degree of similarity with a context vector is calculated as follows: A projection operator with respect to representation space is generated based upon a context vector, and the norm of a vector in subspace, which has been extracted by this projection operator, is calculated, thereby defining degree of similarity with the context vector.

Further, in "A High-speed Algorithm for a Semantic Image Search by a Mathematical Model of Meaning", by Miyahara, Shimizu and Kitagawa, Research Report of the Information Processing Society of Japan, Database System 113-41 (Jul. 15, 1997) (referred to as "Reference 2" below), a high-speed calculation algorithm for such calculation of degree of similarity is proposed. This is a direct application of the projection method in the calculation of distance. More specifically, sorting lists concerning each of the axes are created in advance. When a context vector is given, the priorities of the axes are decided based upon the component values of the context vector. The degree of similarity with the context vector is decided based upon the priorities of the sorting lists and the ranking in each list. With this method, the amount of calculation in preprocessing is on the order of $O(Nlog_2N)$, and the comparison calculation is on the order of the number L of items of data output.

The conventional method of Reference 2 involves certain problems. This will be described in conjunction with FIG. 2, which is a diagram illustrating an example of a sorting list created according to the conventional method of Reference 2.

Figure 2:
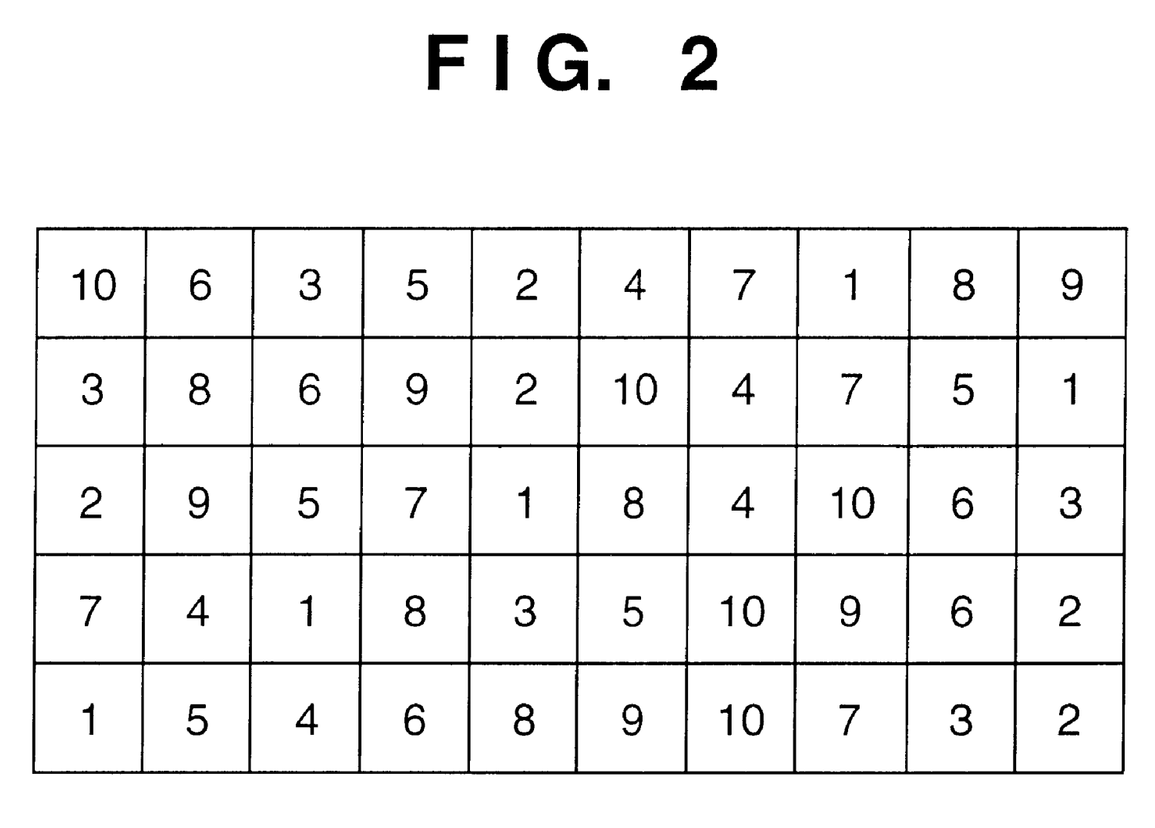
FIG. 2 is a diagram showing an example of a sorting list.

In FIG. 2, each member represents vector ID. Each row forms a sorting list and rows are sorted from the top to the bottom in accordance with priority of axes. Also, in each sorting list, vector IDs are listed from the left side to the right side in accordance with its rank.

According to the method of Reference 2, first it is judged that a vector situated at the top of a sorting list of an axis for which the priority is highest has the highest degree of similarity. In FIG. 2, this vector has the ID number 10. Next, the vector situated at the second rank of the same axis, namely the vector whose ID number is 6 in FIG. 2, is judged to be the vector having the second highest degree of similarity. The vector having the third highest degree of similarity is decided upon as being the vector situated at the top of the sorting list of the axis having the second highest priority. This vector has the ID number 3 in FIG. 2. Thus, with the method of Reference 2, degrees of similarity are decided in the order of position in the lists. As a result, there is a possibility that the order of ID number 6 and ID number 3 will be the reverse of that of the actual degrees of similarity.

SUMMARY OF THE INVENTION

Accordingly, an object of the present invention is to make it possible to select optimum data from data candidates acquired from a plurality of sorting lists that have been obtained, thereby improving the consistency between the precedence of data candidates and actual degree of similarity.

Another object of the present invention is to make it possible to generate some sorting lists at high speed by selecting sorting lists based upon the strengths of components of a query vector.

A further object of the present invention is to make it possible to select an appropriate sorting list by performing the sorting list selection in accordance with the priority of output data.

In accordance with an embodiment of the present invention for attaining the foregoing objects, there is provided a data processing apparatus for extracting, from a set of data having a vector format, a first prescribed number of items of data having a high degree of similarity with a query vector, comprising: a database storing a set of data having a vector format; list creation means for creating lists of data in each of which data of the database is sorted in order of decreasing strength of respective one component of a vector; list-priority decision means for deciding a priority of each list; input means for inputting the query vector; selection means for successively selecting, from the lists, a second prescribed number of items of data not yet output based upon the list priority and ranking in each list; and output means for outputting one item of data, from the second prescribed number of items of data successively selected by the selection means, based upon degree of similarity between each of the second prescribed number of items of data and the query data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

A preferred embodiment of the present invention will now be described in detail in accordance with the accompanying drawings.

Figure 10:
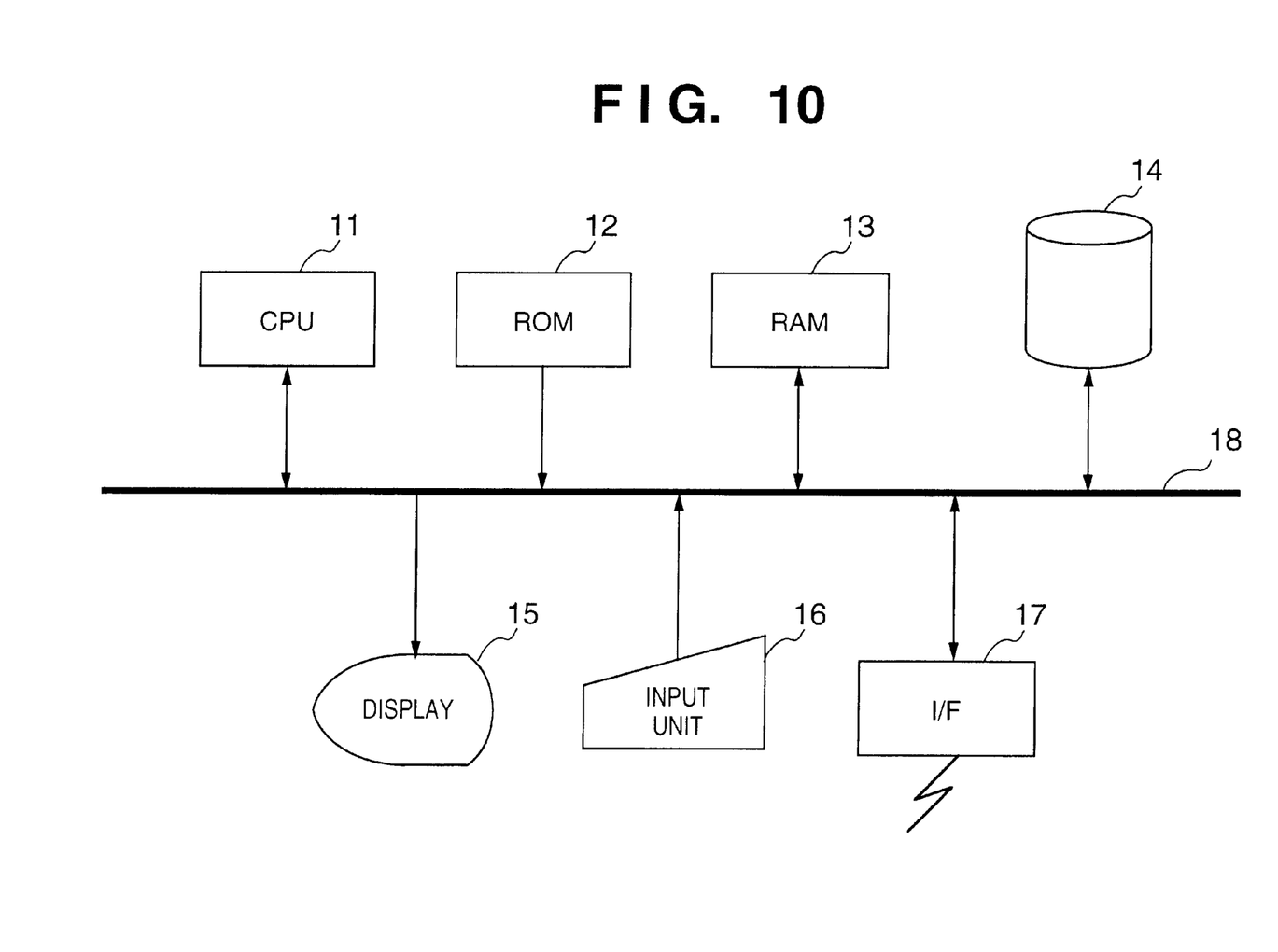
FIG. 10 is a block diagram showing the general construction of a data processing apparatus according to an embodiment of the present invention.

FIG. 10 is a block diagram showing the general construction of a data processing apparatus according to an embodiment of the present invention. As shown in FIG. 10, the apparatus includes a CPU 11 for implementing a variety of control operations by executing control programs that have been stored in a ROM 12 or control programs that have been stored in a RAM 13. The ROM 12 stores various control programs executed by the CPU 11, and the RAM 13 provides a working area for the CPU 11. It goes without saying that the apparatus may be configured in such a manner that control programs are loaded in the RAM 13 from a storage medium such as a hard disk and then executed by the CPU 11 in a manner similar to that of an ordinary personal computer.

The apparatus further includes a hard disk 14 for storing data handled by a database 103, described later; a display 15 for presenting various displays, such as the results of database retrieval; an input unit 16 for entering a query vector; and a network interface 17 that makes it possible to access a remote database. It should be obvious that by thus accessing the database via a network, database search processing can be applied to a remote database as well. The components mentioned above are interconnected by a system bus 18.

Figure 1:
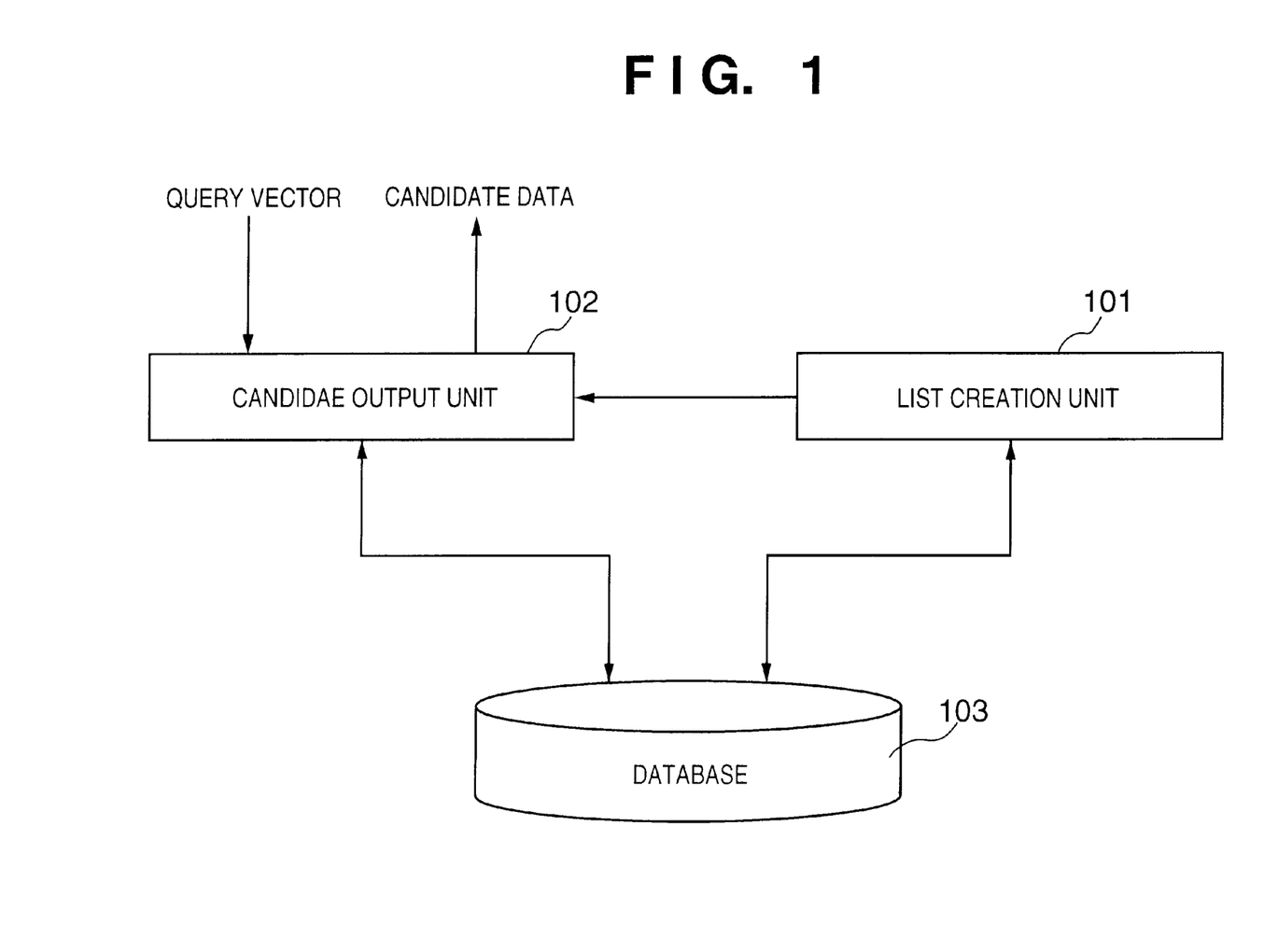
FIG. 1 is a diagram showing the functional structure of an information processing apparatus according to an embodiment of the present invention.

FIG. 1 is a diagram showing the functional structure of a data processing apparatus according to an embodiment of the present invention. In the arrangement shown in FIG. 10, a plurality of functions described below are implemented by using the same CPU to execute various function programs (inclusive of programs corresponding to processing procedures described later in conjunction with the flowcharts) that have been stored in the ROM or hard disk, etc. However, if the units constituting the apparatus implement the functions described below, these may be devices which have their own dedicated program memories and processors. Alternatively, the functions may be implemented by executing a control program that controls specific hardware corresponding to each function.

In FIG. 1, a database 103 stores data to be retrieved described in vector form. A list creation unit 101 creates and stores a list of data IDs arranged in descending order for each vector component in regard to the data stored in the database 103. A candidate output unit 102 calculates the degrees of similarity between a query vector and data in the database 103 and outputs a prescribed number of items of candidate data.

List Creation Unit 101

Assume that data to be processed is expressed as a vector in metric vector space having appropriate dimensions and that M represents the number of dimensions. The strength of an mth component of any data X that belongs to a data set is written as $X_m$ below. Further, data contained in a data set $\Omega$ is written Xj, j ∈ (1, 2, . . . , N).

The list creation unit 101 creates and stores a sorting list for each component value of all data contained in the data set.

The nth value of a sorting list relating to an mth component is written R(m,n). That is, R(m,n) represents an index of a vector having the nth largest value in relation to an mth component.

Candidate Output Unit 102

Figure 7:
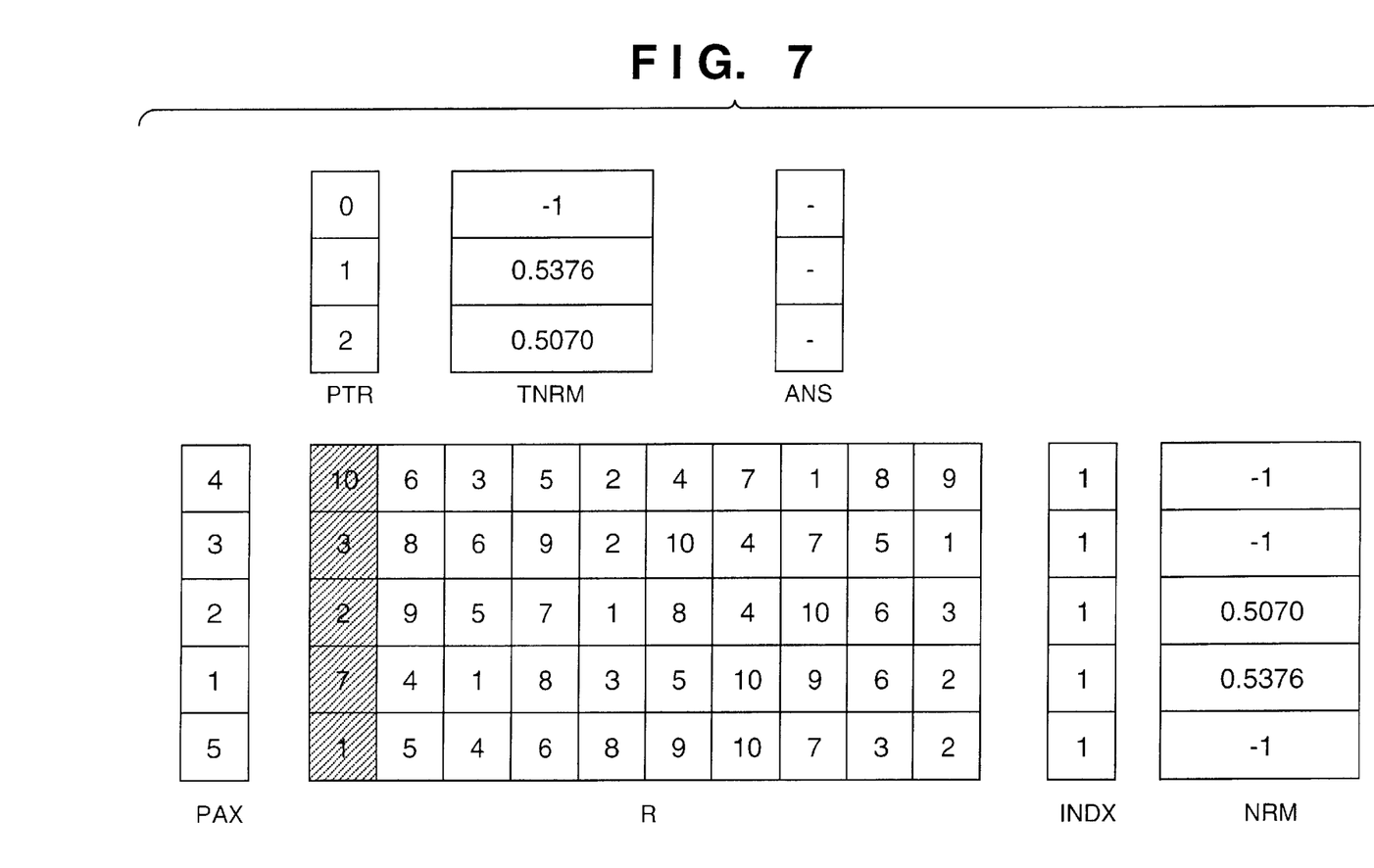
FIG. 7 is a diagram showing results obtained during computation according to a specific example.

The candidate output unit 102 calculates the norm of a vector X under a given context vector. The data used in calculation will be described with reference to FIG. 7 before discussing the flow of this processing. FIG. 7 is a diagram showing results obtained during computation of each item of data according to a specific example.

In FIG. 7, PAX is a vector variable representing the priority of each axis of vector space. The numbers of the axes are stored in order of decreasing priority. In the example of FIG. 7, the fourth component has the highest priority and the third component has the next highest priority. The character R represents a sorting list of data IDs based upon each of the component values. The list is created by the list creation unit 101. INDX is a vector variable indicating which vector of the sorting list R is currently the object of calculation in terms of each component.

In FIG. 7, INDX(1) is 1. This indicates the first vector of the sorting list in regard to the first component, i.e., that the vector of ID 10 is the object of calculation. NRM is a vector variable storing the norm of each vector that is the object of calculation.

PTR is a vector having as components pointers that point to vectors that are the object of calculation. TNRM stores the norms of vectors pointed to by PTR. ANS stores the results of retrieval.

Figure 3:
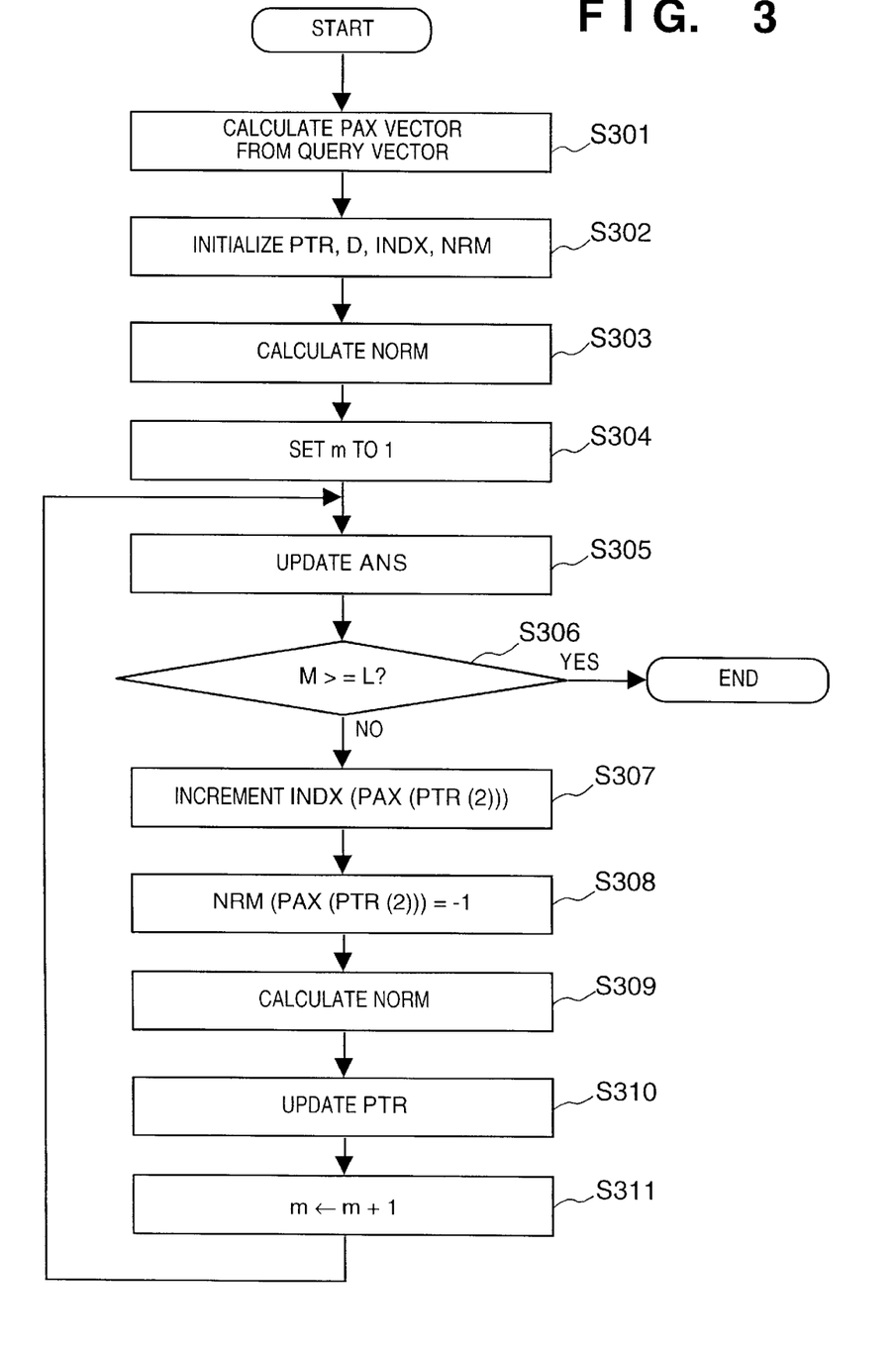
FIG. 3 is a flowchart showing the processing procedure of a candidate output unit.

FIG. 3 is a flowchart showing the processing procedure of the candidate output unit 102. The flow of processing executed by the candidate output unit 102 will be described with reference to this flowchart.

PAX is created at step S301 based upon the component values of a query vector. Here it is assumed that the priorities of axes are decided in order of decreasing component strength of the query vector and that the numbers of the axes are stored in order of decreasing priority. Next, PTR, D, INDX and NRM are initialized at step S302.

Here PTR is a three-dimensional vector having as its components the pointers that point to vectors that are the object of calculation. Initialization is performed in the following manner:

$$PTR=(0,1,2)^T \qquad (1)$$

The character D represents the number of valid components of PAX and is initialized to the number M of dimensions of the vector.

INDX is a vector variable having the same number M of dimensions as the data vector. Stored in INDX(n) is which element is currently the object of calculation in the sorting list for the nth component.

By way of example, when n has been stored in INDX(m), this signifies a pointer that points to the content (the ID number of the vector) of R(m,n). Here all elements of INDX are initialized to 1.

NRM is a vector variable having the same number M of dimensions as the data vector. Stored in NRM(n) is the norm of the ID number indicated by INDX(n). The computation of the norm is not performed until it is required. Storing −1 here indicates that the norm has not yet been calculated. Accordingly, the initial value is set to −1 for all values of NRM.

TNRM is a vector variable having the same number of dimensions as PTR and stores the norms of three vectors indicated by PTR.

The ID number of a vector is decided by PTR, PAX and INDX. In actuality, a vector ID number corresponding to PTR(n) is calculated in accordance with the following equation:

$$J=R(PAX(PTR(n)), INDX(PAX(PTR(n)))) \qquad (2)$$

For example, the ID number of a vector regarding PTR(2) of FIG. 7 is calculated as follows:

$$J=R(PAX(PTR(2)), INDX(PAX(PTR(2))))$$
$$=R(PAX(1), INDX(PAX(1)))$$
$$=R(4, INDX(4))$$
$$=R(4, 1)$$
$$=7$$

Next, at step S303, calculation of the norms of three vectors pointed to by PTR is performed by processing described later with reference to FIG. 4. As a result, the variable TNRM is updated. However, when a vector ID number indicated by PTR is inappropriate, e.g., when the ID number is less than one or exceeds the total number of items of data, or in a case where the index of the matrix R to be pointed to directly by PTR is inappropriate, −1 is stored. As a result, it is possible to judge whether the stored value is valid or not.

This is followed by step S304, at which m is set to 1. Here m represents the ordinal position of the results of retrieval.

Next, at step S305, the vector ID number corresponding to PTR(2) is calculated according to Equation (2) and is output as the mth retrieval result ANS(m).

If m is greater than or equal to the number L of candidates to be output ("YES" at step S306), processing is terminated. If the answer at step S306 is "NO", control proceeds to step S307. Here 1 is added to the content of INDX(PAX(PTR(2))). Next, −1 is stored in NRM(PAX(PTR(2))). In FIG. 7, for example, PTR(2)=1 holds. Therefore, we have INDX (PAX(1))=INDX(4), i.e., 1 is added to the fourth value of INDX. Further, we have NRM(PAX(1))=NRM(4), i.e., the fourth value of NRM is set to −1.

Norms are calculated at step S309 by norm calculation processing described later with reference to FIG. 4, thereby updating the values of TNRM. The values of PTR are updated at step S310 by pointer update processing described later with reference to FIG. 6. Next, 1 is added to m at step S311 and control proceeds to step S305.

Figure 4:
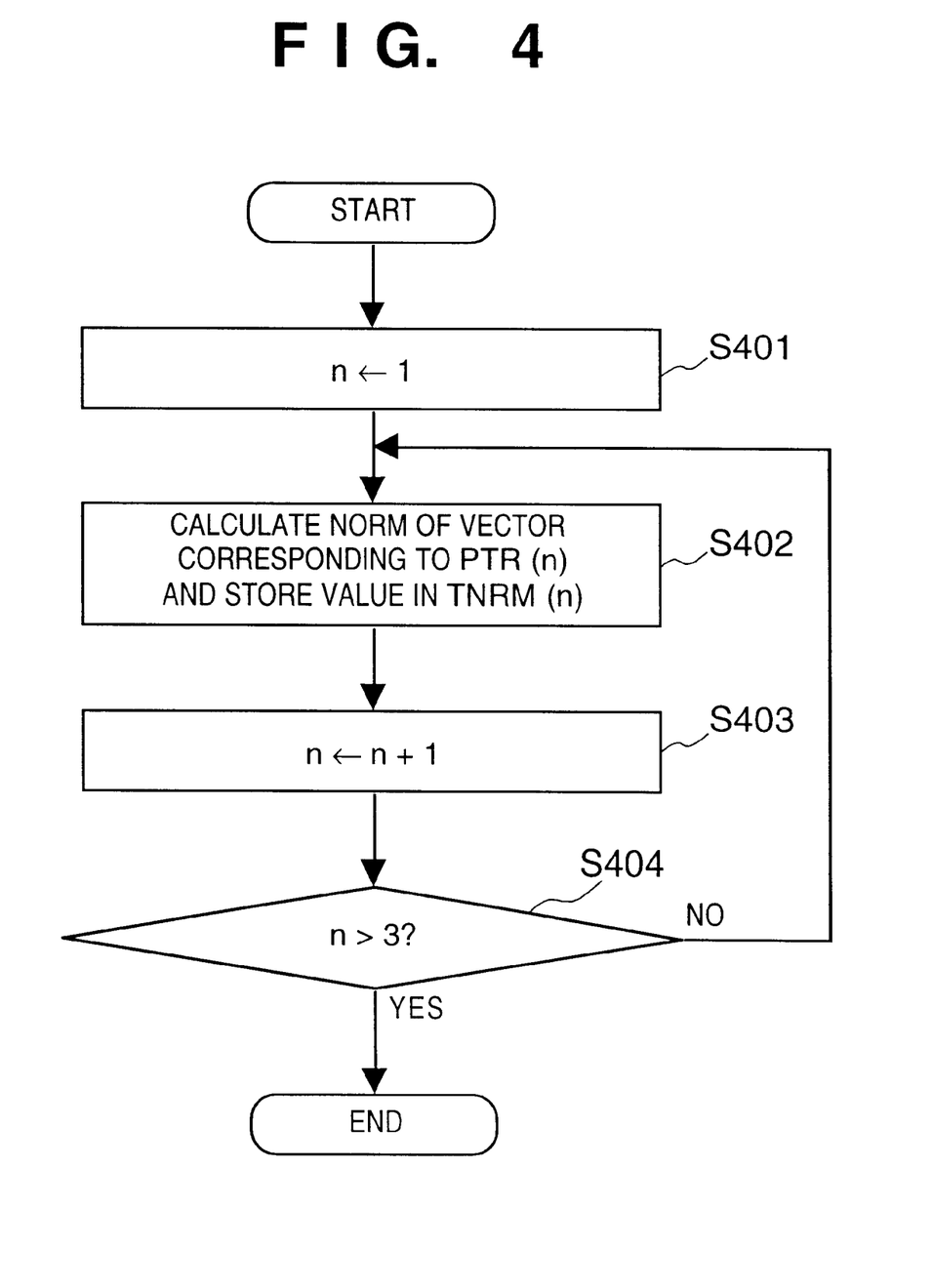
FIG. 4 is a flowchart showing a processing procedure for calculating the norm of a vector pointed to by a pointer.

FIG. 4 is a flowchart showing a processing procedure for calculating the norm of a vector pointed to by a pointer. Processing for calculating the norms of TNRM will now be described with reference to FIG. 4.

First, n is initialized to 1 at step S401. Next, at step S402, the norm of a vector corresponding to PTR(n) is calculated by norm calculation processing described later in conjunction with FIG. 5, and the calculated value is stored in TNRM(n). Next, 1 is added to at step S403. It is then determined at step S404 whether n has exceeded 3. Control proceeds to step S402 if the answer is "NO" and processing is terminated if the answer is "YES".

Figure 5:
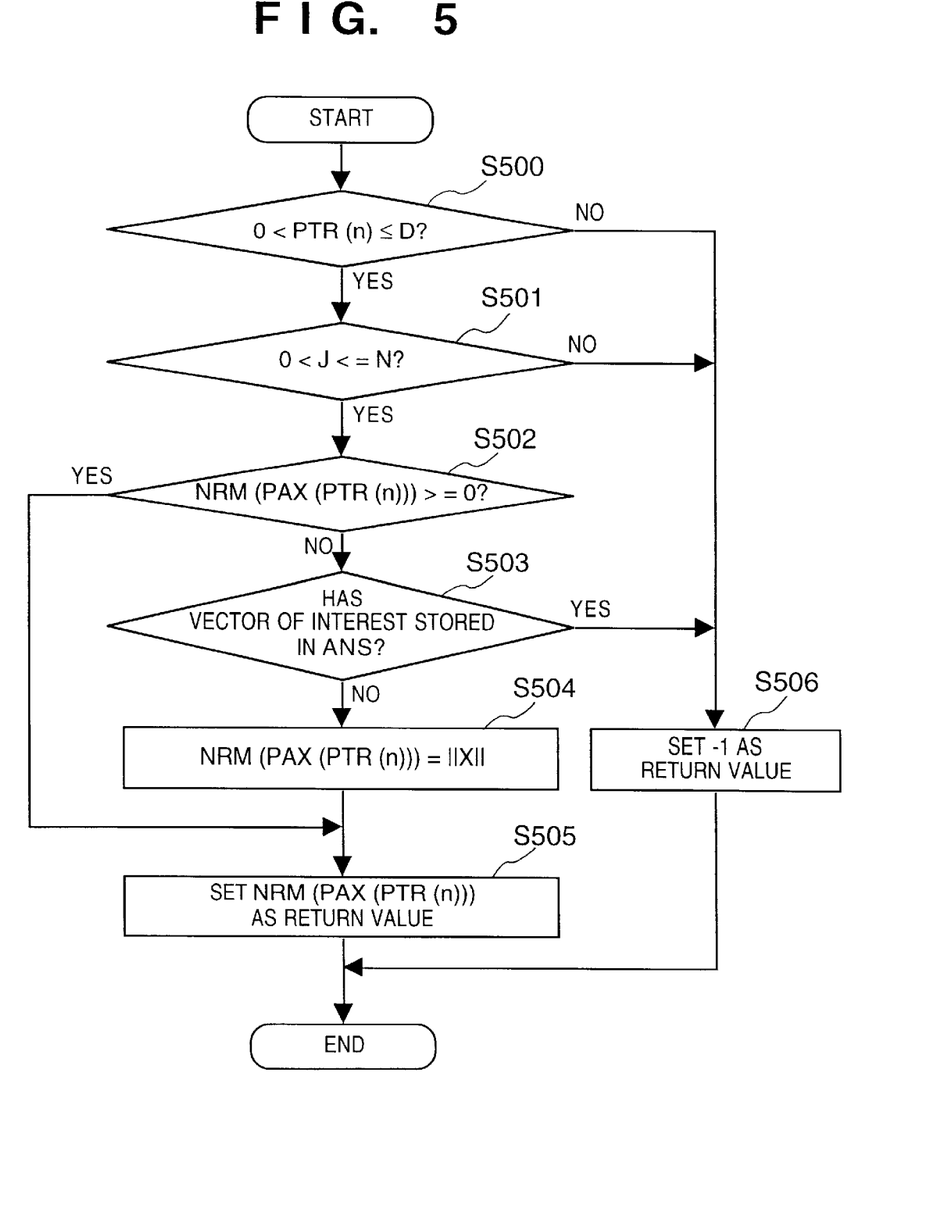
FIG. 5 is a flowchart showing a processing procedure for calculating the norm of each vector.

FIG. 5 is a flowchart showing a processing procedure for calculating the norm of each vector. The norm calculation processing executed at step S402 will be described with reference to FIG. 5. This processing accepts as an argument the content of PTR(n).

In step S500, it is checked if PTR(n) exceeds zero and less than or equal to D. The process proceeds to step S501 if the PTR(n) is within that range, and to step S506 if not.

It is determined at step S501 whether ID number J=R (PAX(PTR(n)), INDX(PAX(PTR(n)))) is greater than 0 and less than or equal to N. Control proceeds to step S502 if the answer is "YES" and to step S506 if the answer is "NO".

It is determined at step S502 whether NRM(PAX(PTR (n))) is non-negative. Control proceeds to step S505 if the answer is "YES" and to step S503 if the answer is "NO".

It is determined at step S503 whether ID number J has already been output as a result. Control proceeds to step S506 if the answer is "YES" and to step S504 if the answer is "NO".

The norm of a vector X of ID number J is calculated in accordance with the following equation and stored in NRM (PAX(PTR(n))) at step S504:

$$\|X\|=(\Sigma_j K_j^2 X_j^2)^{1/2} \qquad (3)$$

where $K=(K_1, K_2, \ldots, K_M)$ is a query vector given by the user. Alternatively, the square of the norm may be used, as indicated by the following equation:

$$\|X\|^2=(\Sigma_j K_j^2 X_j^2) \qquad (3)'$$

Thus, the norm of the vector X is weighted by the component strength of the query vector.

Next, NRM(PAX(PTR(n))) is set as a return value at step S505.

Step S506 calls for −1 to be set as the return value.

Figure 6:
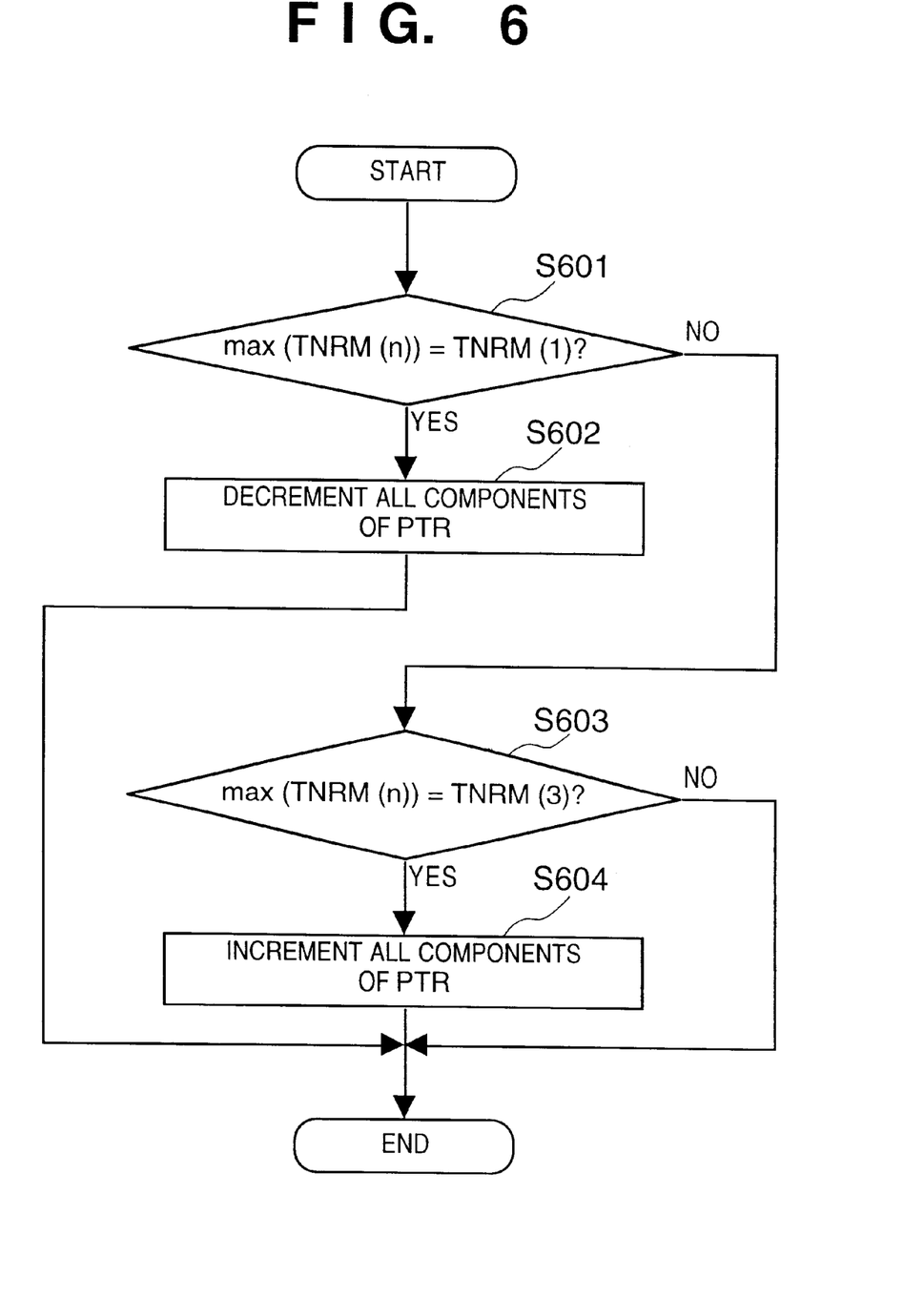
FIG. 6 is a flowchart showing a processing procedure for updating a pointer.

FIG. 6 is a flowchart showing a processing procedure for updating a pointer. The processing executed at step S310 will be described with reference to FIG. 6.

The maximum value of the three components of TNRM is obtained at step S601 in FIG. 6. Control proceeds to step S602 if the index of this value is 1 and to step S603 if the index is not 1. Step S602 calls for 1 to be subtracted from all components of PTR. If it is found at step S603 that the index of the maximum value is 3, control proceeds to step S604; otherwise, processing is terminated. Step S604 calls for 1 to be added to all components of PTR. By virtue of this processing, PTR(2) will point to a vector that corresponds to the maximum value of the three components of TNRM and the ID number thereof will be output as the result of retrieval at step S305.

The foregoing processing will be described further based upon a specific example.

Sorting lists of ten five-dimensional (vertical) vectors indicated below are created using the apparatus described above. Let a query vector K designated by the user be $(0.1208, 0.3529, 0.6511, 0.6595, 0.0439)^T$, and let L=3 hold.

X1=$(0.1612, 0.0346, 0.4996, 0.5000, 0,6879)^T$
X2=$(0.3638, 0.4927, 0.7882, 0.0328, 0.0507)^T$
X3=$(0.5638, 0.7144, 0.0082, 0.4081, 0.0712)^T$
X4=$(0.2602, 0.4280, 0.3671, 0.5799, 0.5274)^T$
X5=$(0.4488, 0.0783, 0.5570, 0.3543, 0.5972)^T$
X6=$(0.6401, 0.5359, 0.1845, 0.0334, 0.5176)^T$
X7=$(0.2215, 0.4629, 0.5105, 0.6688, 0.2465)^T$
X8=$(0.1550, 0.6164, 0.4534, 0.4726, 0.4087)^T$
X9=$(0.0603, 0.5242, 0.7343, 0.2263, 0.3622)^T$
X10=(0.7386, 0.4604, 0.2291, 0.2649, 0.3462)T

The list creation unit 101 generates and stores the following five lists as descending-order lists relating to the strengths of the components:

first component →{X10, X6, X3, X5, X2, X4, X7, X1, X8, X9}
second component →{X3, X8, X6, X9, X2, X10, X4, X7, X5, X1}
third component →{X2, X9, X5, X7, X1, X8, X4, X10, X6, X3}
fourth component →{X7, X4, X1, X8, X3, X5, X10, X9, X6, X1}
fifth component →{X1, X5, X4, X6, X8, X9, X10, X7, X3, X2)

The amount of calculation involved in calculating the descending-order lists is O(NlogN) with respect to N items of data. If a vector has M dimensions, therefore, then it will suffice to perform O(MNlogN) of preparatory operations in advance.

Next, the candidate output unit 102 executes processing.

At step S301, PAX can be decided from the component values of the query vector as follows (in this embodiment, PAX is decided in accordance with the order of the component strengths of the query vector):

$$PAX=(4, 3, 2, 1, 5) \qquad (4)$$

Initialization is carried out in the following manner at step S302:

D=5
PTR=(0, 1, 2)
INDX=(1, 1, 1, 1, 1)
NRM=(−1, −1, −1, −1, −1)

The norm is calculated at step S303. Since PTR(1) equals to zero and it does not exceed zero, an ID number corresponding to PTR(1) does not exist and −1 is stored as TNRM(1).

The index of the matrix R corresponding to PTR(2) is (PAX(PTR(2)), INDX(PAX(PTR(2))))=(PAX(1), INDX(PAX(1)))=(4,1) and the value of R(4,1), namely 7, is given as the vector ID number. If the norm of vector X7 of ID 7 is calculated using Equation (3), 0.5376 is obtained and is stored in NRM(PAX (PTR(2)))=NRM(4). Similarly, with respect to PTR(3), the norm 0.5070 of X2 is stored in NRM(PAX(PTR(3)))=NRM (3).

At step S304, m is set to 1, and 7, which is the vector ID number corresponding to PTR(2), is output at step S305. It is determined at step S306 whether m is greater than or equal to L. Since m is less than L, control proceeds to step S307.

At step S307, 1 is added to the value of INDX(PAX(PTR (2)))=INDX(4), making the sum 2. At step S308, −1 is stored in NRM(PAX(PTR(2)))=NRM(4).

The norms are calculated at step S309. The indices of NRM being pointed to by PTR are 4 and 3. Of NRM(4) and NRM(3), the value which is negative is NRM(4), and therefore the norm of the vector whose ID number is R(4, INDX(4))=R(4,2)=4 is calculated. A value 0.3945 is obtained as the result and this value is stored in NRM(4) and TNRM(2).

The values of PTR are updated at step S310. If this is performed in accordance with the flowchart shown in FIG. 6, processing is executed based upon the values of TNRM. Currently, TNRM is as follows:

$$TNRM=(-1, 0.3945, 0.5070)^T$$

Since the index of the component giving the maximum value is 3, 1 is added to all values of PTR and we have $$PTR=(1, 2, 3)^T$$

Figure 8:
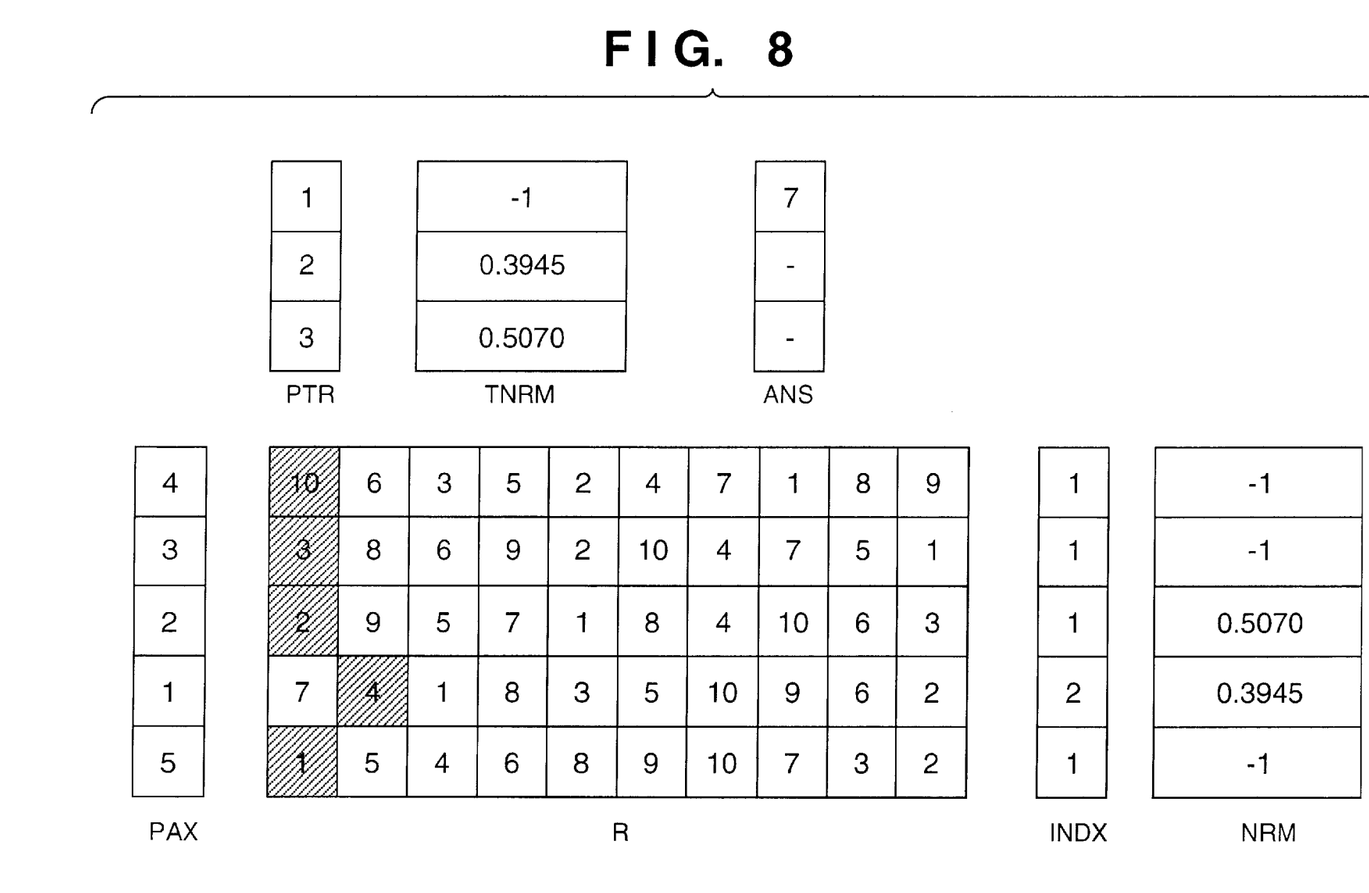
FIG. 8 is a diagram showing results obtained during computation according to a specific example.

The value of each item of data is updated as shown in FIG. 8 by the processing thus far.

At step S311, 1 is added to m, and R(PAX(PTR(2)), INDX(PAX(PTR(2))))=2 is output as the second result. It is determined at step S306 whether m is greater than or equal to L. Since m is less than L, control proceeds to step S307. Here 1 is added to INDX(PAX(PTR(2)))=1, giving 2. Next, −1 is stored in NRM(PAX(PTR(2))) at step S308.

The norms are calculated at step S309. Among NRM(PTR (1)), NRM(PTR(2)), NRM(PTR(3)), those for which 1 holds are NRM(PTR(2)) and NRM(PTR(3)). Accordingly, the norms of the vectors corresponding to these, namely the norms of the vectors whose ID numbers are 9 and 3, are calculated. As a result, we have

NRM(PTR(3))=0.4880, TNRM(2)=0.4880
NRM(PTR(2))=0.3286, TNRM(3)=0.3286

Figure 9:
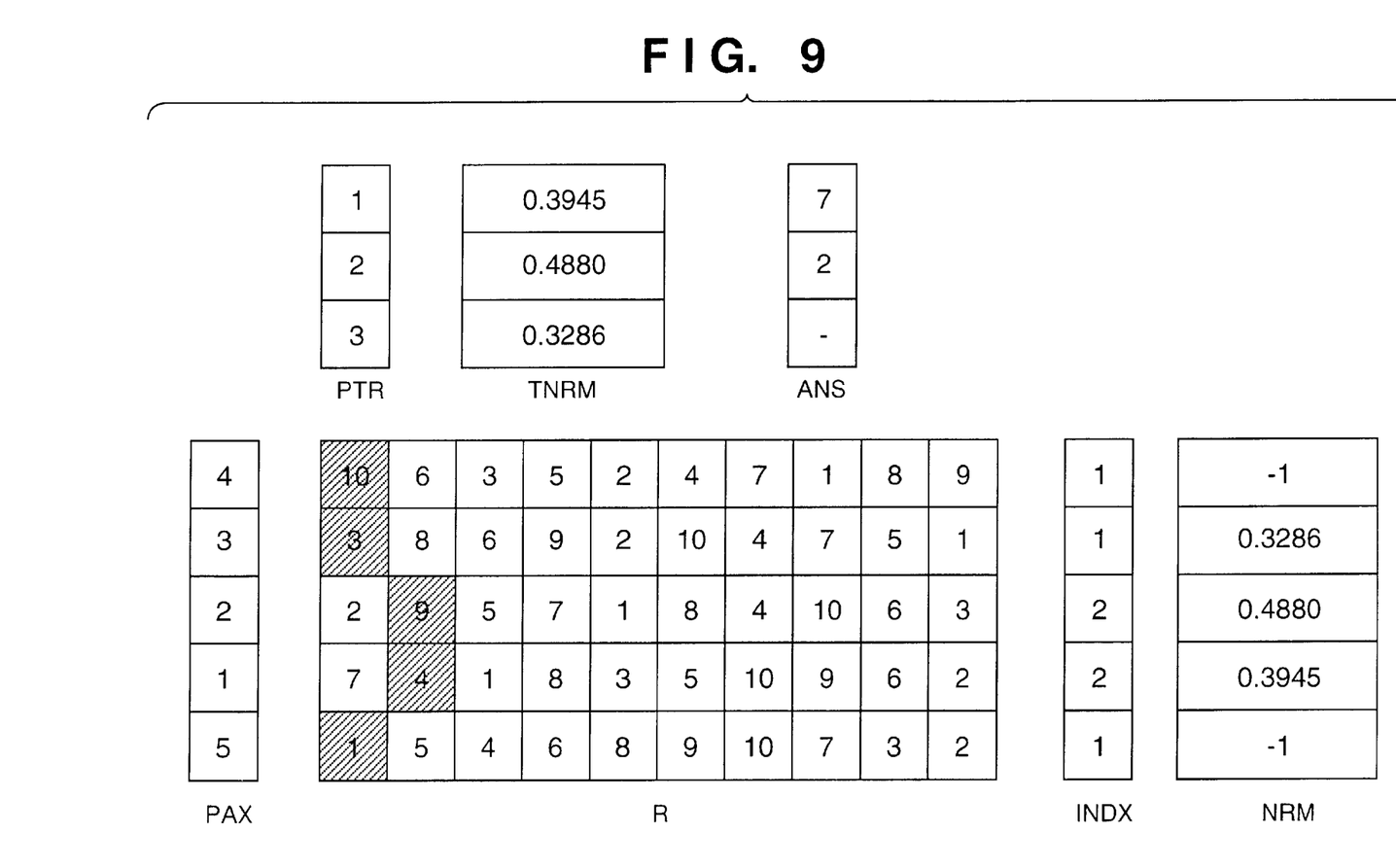
FIG. 9 is a diagram showing results obtained during computation according to a specific example.

PTR is updated at step S310. Since the component of TNRM that takes on the largest value is the second component, the values of PTR remain intact. The value of each item of data is updated as shown in FIG. 9 by the processing thus far.

At step S311, m is updated. Since R(PAX(PTR(2)), INDX (PAX(PTR(2))))=R(3,2)=9, 9 is output as the result at step S305. It is determined at step S306 whether m is greater than or equal to L. Since m=L holds processing is terminated.

A candidate list {X7, X2, X9} is obtained as the output in the above-described example. If this is compared with the three high-order members of {X7, X2, X9, X8, X4, X1, X3, X5, X10, X6} obtained as the result of performing inner-product calculation in accurate fashion, it will be understood that all results of the above-described high-speed approximation calculation will be correct solutions. Though there is no assurance that correct solutions will always be given, it is expected that the present process will provide good approximate solutions. The amount of calculation involved in the above-described processing need be only ML-number of multiplications and additions in regard to a vector of M dimensions and L-number of items of data to be extracted.

By contrast, in order to perform the usual inner-product calculations, MN-number of multiplications and additions will be required to calculate each of the inner products, where N represents the total number of items of data. Accordingly, in a case where L is very small in comparison with N, this technique is advantageous in terms of the amount of calculation. A situation where a very large N is dealt with is always encountered in ordinary recognition problems. There will be many cases in which, if at most several items of data close to basic data K are obtained at such time, it is fully effective as far as subsequent processing is concerned. The above-described method is useful in such cases.

It goes without saying that the invention is applicable also to a case where the object of the invention is attained by supplying a storage medium storing the program codes of the software for performing the functions of the foregoing embodiment to a system or an apparatus, reading the stored program codes with a computer of the system or apparatus from the storage medium, and then executing the program codes.

Furthermore, besides the case where the aforesaid functions according to the embodiment are implemented by executing the program codes read from the storage medium by a computer in the apparatus or system, it goes without saying that the present invention covers a case where an operating system or the like running on the computer implements the above-mentioned functions by processing based upon designation of the program codes.

In these cases the storage medium storing the program codes constitutes the present invention.

Thus, in accordance with the present invention, as described above, some sorting lists of a data set based upon degree of similarity with a given vector can be generated at high speed. As a result, retrieval speed can be shortened to a marked extent in a case where data having a high degree of similarity with a query vector is retrieved from a database.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus for extracting, from a set of data having a vector format stored in a database, a first prescribed number of items of data having a high degree of similarity with a query vector, comprising:

a database storing a set of data having a vector format;

list creation means for creating lists of data in each of which data of said database is sorted in order of decreasing strength of respective one component of a vector;

list-priority decision means for deciding a priority of each list;

input means for inputting the query vector;

selection means for successively selecting, from the lists based upon the list priority and ranking in each list, a second prescribed number of items of data not yet output;

similarity calculation means for calculating a degree of similarity between the query vector and each of only the second prescribed number of items of data selected by said selection means;

output means for outputting one item of data, from the second prescribed number of items of data successively selected by said selection means, based upon degree of similarity between each of the second prescribed number of items of data and the query vector; and control means for controlling said selection means, said similarity calculation means, and said output means to repeat operations until the first prescribed number of items of data are output from said output means.

2. The apparatus according to claim 1, wherein said list-priority decision means decides the list priority based upon strengths of components of the query vector.

3. The apparatus according to claim 1, wherein the degree of similarity is a norm of each item of data that is weighted based upon strengths of components of the query vector.

4. The apparatus according to claim 1, wherein said selection means selects the second prescribed number of lists from said lists and selects, from each selected list, most significant data among the data not yet output.

5. The apparatus according to claim 4, wherein said selection means selects the second prescribed number of lists based upon priority of the list to which data output last by said output means belonged.

6. The apparatus according to claim 1, wherein said similarity calculating means calculates a degree of similarity between the query vector and data, among the data of the second prescribed number of items selected by said selection means, of which a degree of similarity has not been calculated.

7. A data processing method for extracting, from a set of data having a vector format stored in a database, a first prescribed number of items of data having a high degree of similarity with a query vector, comprising:

a list creation step of creating lists of data in each of which data of said database is sorted in order of decreasing strength of respective one component of a vector;

a list-priority decision step of deciding a priority of each list;

an input step of inputting the query vector;

a selection step of successively selecting, from the list based upon the list priority and ranking in each list, a second prescribed number of items of data not yet output;

a similarity calculation step of calculating a degree of similarity between the query vector and each of only the second prescribed number of items of data selected in said selection step;

an output step of outputting one item of data, from the second prescribed number of items of data successively selected by said selection step, based upon degree of similarity between each of the second prescribed number of items of data and the query data, and a control step of controlling said selection step, said similarity calculation step, and said output step to repeat operations until the first prescribed number of items of data are output in said output step.

8. The method according to claim 7, wherein said list priority decision step decides the list priority based upon strengths of components of the query vector.

9. The method according to claim 7, wherein the degree of similarity is a norm of each item of data that is weighted based upon strengths of components of the query vector.

10. The method according to claim 7, wherein said selection step selects the second prescribed number of lists from said lists and selects, from each selected list, most significant data among the data not yet output.

11. The method according to claim 10, wherein said selection step selects the second prescribed number of lists based upon priority of the list to which data output last by said output step belonged.

12. The method according to claim 7, wherein said similarity calculation step calculates a degree of similarity between the query vector and data, among the data of the second prescribed number of items selected by said selection step, of which a degree of similarity has not been calculated.

13. A storage medium storing a data processing program for causing a computer to extract, from a set of data having a vector format stored in a database, a first prescribed number of items of data having a high degree of similarity with a query vector, said data processing program having:

program code of a list creation step of creating lists of data in each of which data of said database is sorted in order of decreasing strength of respective one component of a vector;

program code of a list-priority decision step of deciding a priority of each list;

program code of an input step of inputting the query vector;

program code of a selection step of successively selecting, from the lists based upon the list priority and ranking in each list, a second prescribed number of items of data not yet output;

program code of a similarity calculation step of calculating a degree of similarity between the query vector and each of only the second prescribed number of items of data selected in the selection step;

program code of an output step of outputting one item of data, from the second prescribed number of items of data successively selected by said selection step, based upon degree of similarity between each of the second prescribed number of items of data and the query data, and program code of a control step for controlling the selection step, the similarity calculation step, and the output step to repeat operations until the first prescribed number of items of data are output by the output step.

* * * * *